(12) United States Patent
Hashimoto et al.

(10) Patent No.: US 7,839,046 B2
(45) Date of Patent: Nov. 23, 2010

(54) CLAW POLE TYPE MOTOR AND PUMP

(75) Inventors: Toshiharu Hashimoto, Nagoya (JP);
Hiroki Inoue, Hikone (JP); Hidekazu Yabuuchi, Hikone (JP); Masaaki Nishikata, Fukuoka (JP); Shinji Suematsu, Fukuoka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 136 days.

(21) Appl. No.: 12/232,556

(22) Filed: Sep. 19, 2008

(65) Prior Publication Data
US 2009/0079293 A1   Mar. 26, 2009

(30) Foreign Application Priority Data
Sep. 20, 2007   (JP)   ............... 2007-243423

(51) Int. Cl.
*H02K 1/12* (2006.01)
*H02K 1/14* (2006.01)

(52) U.S. Cl. ...................................... 310/257

(58) Field of Classification Search ............ 310/43, 310/44, 49.09, 49.11, 49.15, 49.17, 49.19, 310/49.21, 216.066–216.067, 257
See application file for complete search history.

(56) References Cited

U.S. PATENT DOCUMENTS

| | | | |
|---|---|---|---|
| 4,107,559 A * | 8/1978 | Patel | ........................ 310/49.12 |
| 5,331,237 A | 7/1994 | Ichimura | |
| 6,663,362 B1 | 12/2003 | Lentz et al. | |
| 2006/0208602 A1 * | 9/2006 | Enomoto et al. | ............ 310/257 |
| 2006/0273670 A1 * | 12/2006 | Tung et al. | ................ 310/67 R |
| 2008/0018194 A1 * | 1/2008 | Kakugawa et al. | .......... 310/257 |
| 2008/0018195 A1 * | 1/2008 | Kitamura et al. | ............ 310/257 |

FOREIGN PATENT DOCUMENTS

| | | | |
|---|---|---|---|
| JP | 05-308768 | | 11/1993 |
| JP | 2003-515059 | | 4/2003 |
| JP | 2004015998 A | * | 1/2004 |
| JP | 2005-168123 | | 6/2005 |
| JP | 2007-209198 | | 8/2007 |

* cited by examiner

*Primary Examiner*—Tran N Nguyen
(74) *Attorney, Agent, or Firm*—Bacon & Thomas, PLLC

(57) ABSTRACT

A claw pole type motor includes a rotor having a magnet arranged on an outer circumferential surface thereof and a stator including an annular iron core and an annular coil received within the iron core. The iron core includes a yoke portion opened in an inner circumferential surface opposite to the rotor, a plurality of upper claw-shaped magnetic poles and a plurality of lower claw-shaped magnetic poles which are arranged along an inner circumferential surface of the annular coil. The upper/lower claw-shaped magnetic poles are curved to extend axially downwardly/upwardly from an upper/lower inner edge of the yoke portion, respectively. The upper and the low claw-shaped magnetic poles are alternately arranged along a circumferential direction of the iron core. The yoke portion has cutout portions formed in non-magnetic path regions which do not include magnetic paths through which magnetic flux flows between neighboring claw-shaped magnetic poles across the annular coil.

4 Claims, 10 Drawing Sheets

CLAW POLE TYPE MOTOR AND PUMP

FIELD OF THE INVENTION

The present invention relates to a claw pole type motor and a pump using the motor as a driving power source.

BACKGROUND OF THE INVENTION

It is known that a pump for sucking and discharging, e.g., liquid, employs a claw pole type motor with claw-shaped magnetic poles as a motor for rotatingly driving an impeller (see, e.g., Japanese Patent Laid-open Application No. 2003-505648). The claw pole type motor is simple in structure and therefore is advantageous in that it can enjoy enhanced productivity and reduced production costs thereof.

A stator of a claw pole type motor is formed of an iron core having a plurality of claw-shaped magnetic poles arranged in a circumferential direction and an annular coil received within the iron core. The iron core serves as a magnetic circuit and is formed of a molded article. Although the material cost can be saved by removing unnecessary portions, it would be undesirable if this results in deterioration of the function of the iron core as the magnetic circuit.

SUMMARY OF THE INVENTION

In view of the above, the present invention provides a claw pole type motor and a pump using the motor capable of saving the material cost without deteriorating the function of an iron core.

In accordance with the present invention, there is provided a claw pole type motor including: a rotatably supported rotor having a magnet arranged on an outer circumferential surface thereof; and a stator including an annular iron core arranged around the outer circumferential surface of the rotor in a facing relationship with the rotor and an annular coil received within the iron core.

Herein, the iron core includes a yoke portion having a generally C-like cross sectional shape and opened in an inner circumferential surface opposite to the rotor, a plurality of upper claw-shaped magnetic poles arranged along an inner circumferential surface of the annular coil and curved to extend axially downwardly from an upper inner edge of the yoke portion and a plurality of lower claw-shaped magnetic poles arranged along an inner circumferential surface of the annular coil and curved to extend axially upwardly from a lower inner edge of the yoke portion, the upper claw-shaped magnetic poles and the lower claw-shaped magnetic poles being alternately arranged along a circumferential direction of the iron core, the yoke portion having cutout portions formed in non-magnetic path regions which does not include magnetic paths through which magnetic flux flows between neighboring claw-shaped magnetic poles across the annular coil.

The magnetic paths may be demarcated by straightly interconnecting position-corresponding boundary points of the neighboring claw-shaped magnetic poles along an outer circumferential surface of the yoke portion.

The yoke portion may include a cylindrical sidewall portion covering an outer circumferential surface of the annular coil and a pair of end surface portions between which the annular coil is interposed in a vertical direction, the cutout portions being formed only in the end surface portions. In this case, the cutout portions formed in one of the end surface portions may preferably be expanded toward the sidewall portion beyond cutouts which are formed to secure a gap with respect to the claw-shaped magnetic poles extending from the other end surface portion.

Also, it is preferable that the yoke portion includes a cylindrical sidewall portion covering an outer circumferential surface of the annular coil and a pair of end surface portions between which the annular coil is interposed in a vertical direction, the cutout portions being formed over the end surface portions and the sidewall portion.

The iron core may be formed of a dust core produced by compression-molding of insulation-coated iron powder and a binder. Or, the iron core may preferably be produced by injection-molding a magnetic material formed of a mixture of insulation-coated iron powder and a binder.

A pump may employ the claw pole type motor described above as a driving power source.

In accordance with a first aspect of the present invention, the cutout portions is provided in the iron core so that it makes possible to reduce the quantity of the material used in forming the iron core, thereby saving material cost and the like. Since the cutout portions are formed in the non-magnetic path regions of the iron core, there is no possibility that the cutout portions act as an obstacle in the magnetic path. This makes it possible to suppress deterioration of the function of the iron core as the magnetic circuit.

In accordance with a second aspect of the present invention, the cutout portions help to widen the cavity portions of the iron core. Therefore, in case of molding the stator in a pump, it is possible to widen the flow path of a molding material in the iron core. This enhances moldability, which leads to an increase in the yield and a decrease in the production cost.

BRIEF DESCRIPTION OF THE DRAWINGS

The object and features of the present invention will become apparent from the following description of embodiments given in conjunction with the accompanying drawings, in which.

DETAILED DESCRIPTION OF THE EMBODIMENTS

Hereinafter, an exemplary embodiment of the present invention will be described with reference to FIGS. 1 to 9C, which form a part hereof.

First Embodiment

Figure 1:
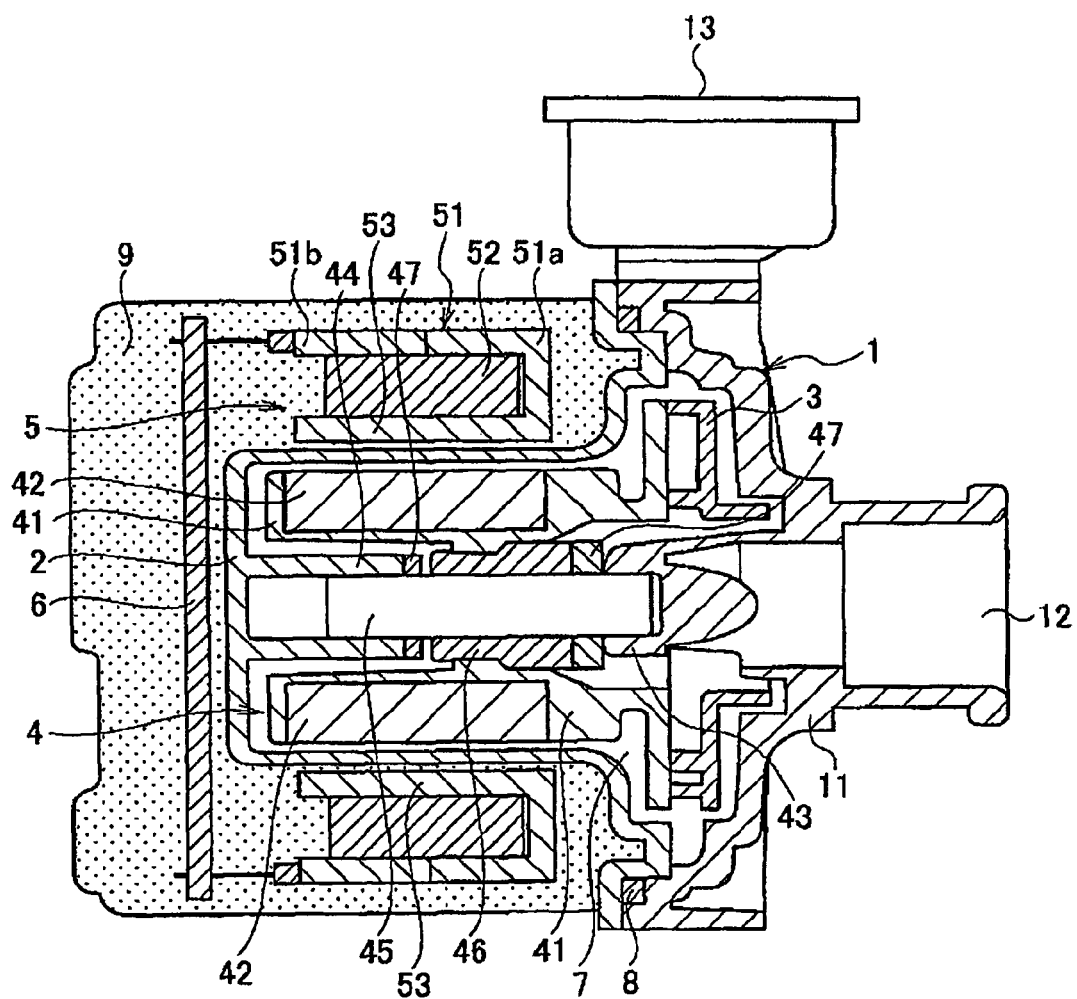
FIG. 1 is a section view showing a pump in accordance with a first embodiment.

FIG. 1 is a section view showing a pump in accordance with a first embodiment of the present invention. This pump makes use of a claw pole type motor as its driving power source and is mainly formed of a pump case 1, a partition 2, an impeller 3, a rotor 4, a stator 5 and a control circuit board 6.

The pump case 1 and the partition 2 are coupled together to define a pump chamber 7. A seal member 8 is arranged in the coupling portion of the pump case 1 and the partition 2 to secure liquid-tightness of the pump chamber 7. The impeller 3 and the rotor 4 are rotatably received within the pump chamber 7 in a mutually integrated state. The stator 5 is arranged around the rotor 4 in a facing relationship with the latter, with the partition 2 interposed therebetween, thereby forming a so-called inner rotor structure. The entire portions of the pump except the pump case 1 are covered with a molded resin 9. In other words, the partition 2, the stator 5 and the control circuit board 6 are coated with the molded resin 9.

The pump case 1 forms the pump chamber 7 together with the partition 2 and includes a case body 11 for defining the pump chamber 7, a suction port 12 and a discharge port 13. The suction port 12 is formed at a center of a ceiling surface of the case body 11 and serves as an opening through which liquid is sucked into the pump chamber 7. The discharge port 13 is formed in the sidewall of the case body 11 and serves as an opening through which liquid is discharged from the pump chamber 7.

The partition 2 forms together with the pump case 1 the pump chamber 7 and serves to liquid-tightly isolate the rotor 4 from the stator 5. (that is, to isolate the pump part from the motor part).

The impeller 3 is integrally attached to the rotor 4 and is rotated together with the rotor 4. When rotated, the impeller 3 sucks liquid into the pump chamber 7 through the suction port 12 and discharges the liquid out of the pump through the discharge port 13 by applying a centrifugal force to the liquid thus sucked.

The rotor 4 is formed of a cylindrical shape and is adapted to rotatingly drive the impeller 3. The rotor 4 includes a cylindrical rotor body 41 and a magnet 42 provided on the outer wall (outer circumference) of the rotor body 41 to form a magnetic circuit (magnetic flux). A fixed shaft 45 is inserted into and fitted to a shaft supporting portion 43 of the pump case 1 and a shaft supporting portion 44 of the partition 2. The rotor body 41 is rotatably supported about the fixed shaft 45 through a bearing portion 46. The fixed shaft 45 is held against rotation by means of a pair of anti-rotation plates 47 attached to the opposite ends thereof. In between the magnet 42 and the partition 2, there is provided a gap (clearance) wide enough to keep the magnet 42 and the partition 2 out of contact during rotation of the rotor 4.

The stator 5 includes an annular iron core 51 arranged to face with the outer circumference of the rotor 4 and an annular coil 52 received within the iron core 51. The magnetic field generated in the annular coil 52 of the stator 5 by an electric current flowing therein is transferred from a plurality of claw-shaped magnetic poles (claw poles) 53 of the iron core 51 to the rotor 4. One of the features of the present embodiment resides in the structure of the stator 5, the details of which will be described later.

The control circuit board 6 is provided at a rear side of the partition 2. In response to a signal issued from a position detection sensor (not shown) for detecting the rotational position of the rotor 4, the control circuit board 6 controls the electric current flowing in the annular coil 52. Depending on the rotational position of the rotor 4, the control circuit board 6 controls the magnetic field generated in the annular coil 52.

In the pump configured as described above, as the magnetic fields generated in the annular coil 52 is propagated from the claw-shaped magnetic poles 53 to the magnet 42, the magnet 42 is attracted and repelled so that the impeller 3 integrally formed with the rotor 4 can rotate about the fixed shaft 45. Rotation of the impeller 3 initiates a pumping action whereby liquid is sucked into the pump chamber 7 through the suction port 12 and pressurized within the pump chamber 7. The pressurized liquid is pumped radially circumferentially and discharged out of the pump through the discharge port 13.

Figure 2:
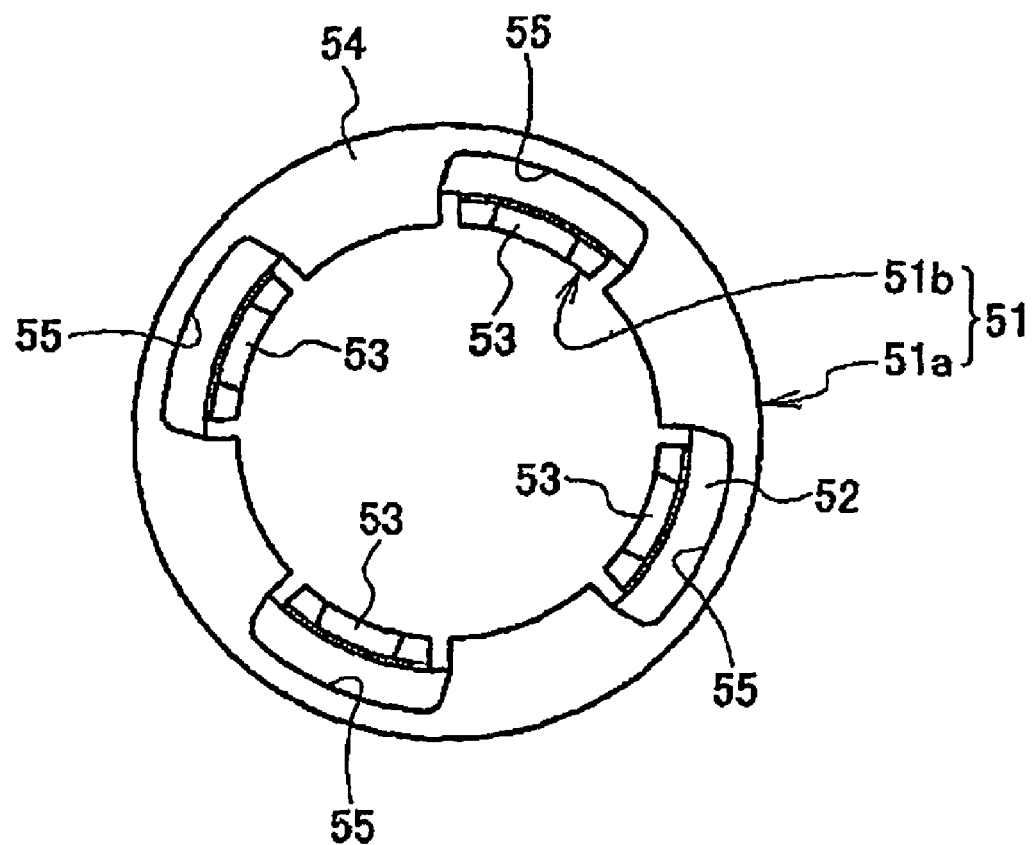
FIG. 2 is a top plan view schematically showing a stator 5 in accordance with the first embodiment.
Figure 3A:
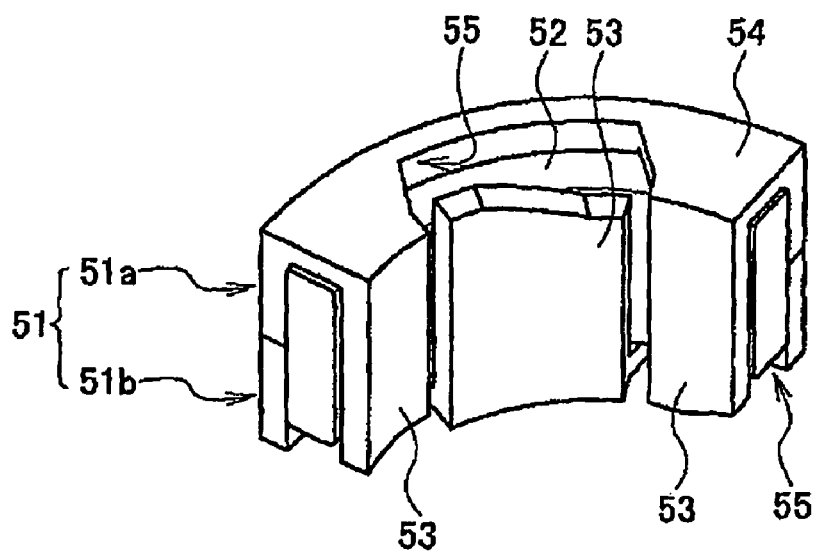
FIGS. 3A and 3B are partially cut-away schematic perspective views of the stator 5.
Figure 3B:
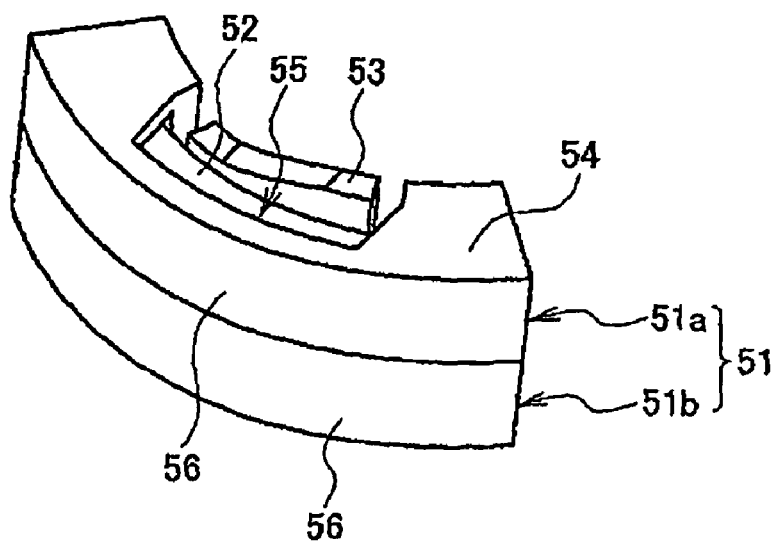

FIG. 2 is a top plan view schematically showing the stator 5 in accordance with the first embodiment. FIGS. 3A and 3B are partially cut-away schematic perspective views of the stator 5 shown in FIG. 2, wherein FIG. 3A shows an appearance of the stator 5 as viewed from the inner circumferential side while FIG. 3B shows an appearance of the stator 5 as viewed from the outer circumferential side. As mentioned earlier, the stator 5 includes the annular iron core 51 and the annular coil 52 received within the iron core 51.

The iron core 51 includes a yoke portion and a plurality of claw-shaped magnetic poles 53. The yoke portion has a generally C-like cross sectional shape opened in the inner circumferential surface opposite to the rotor 4. The yoke portion has a cylindrical sidewall portion 56 for covering the outer circumferential surface of the annular coil 52 and a pair of end surface portions 54 between which the annular coil 52 is embedded in a vertical direction. The claw-shaped magnetic poles 53 are arranged in plural numbers (eight in the present embodiment) at an equal interval along the inner circumferential surface of the annular coil 52. The claw-shaped magnetic poles 53 include upper claw-shaped magnetic poles 53 curved to extend axially downwardly from the upper inner edge of the yoke portion, i.e., the inner edge of the upper end surface portion 54, and lower claw-shaped magnetic poles 53 curved to extend axially upwardly from the lower inner edge of the yoke portion, i.e., the inner edge of the lower end surface portion 54. In this regard, the upper claw-shaped magnetic poles 53 and the lower claw-shaped magnetic poles 53 are alternately arranged along the circumferential direction.

The iron core 51 is formed of a dust core produced by compression-molding of insulation-coated iron powder and a binder. More specifically, iron powder is subjected to an insulating treatment such as a phosphate coating treatment or the like and thermosetting resin such as epoxy or the like is applied on a mold. Then, the iron powder is filled in the mold and compressed into an iron core. The iron core thus compressed is taken out from the mold. In view of the ease of assembly of the annular coil 52 received within the iron core 51, the iron core 51 employed in the present embodiment is formed of an upper iron core 51a and a lower iron core 51b, both of which are separable from each other. The upper iron core 51a is produced by integrally forming the upper end surface portion 54, the upper claw-shaped magnetic poles 53 extending from the upper end surface portion 54 and the upper cylindrical region of the sidewall portion 56. Likewise, the lower iron core 51b is produced by integrally forming the lower end surface portion 54, the lower claw-shaped magnetic poles 53 extending from the lower end surface portion 54 and the lower cylindrical region of the sidewall portion 56.

The annular coil 52 is produced by winding an electric wire on a coil bobbin (an insulating body) not shown in the drawings.

One of the features of the present embodiment resides in that cutout portions 55 are formed in the yoke portion including the upper and lower end surface portions 54 and the sidewall portion 56. The cutout portions 55 are formed by cutting away non-magnetic path regions of the yoke portion which does not include magnetic paths formed by the magnetic flux flowing through the neighboring claw-shaped magnetic poles 53.

FIGS. 4A and 4B and FIGS. 5A and 5B are perspective views schematically illustrating the magnetic flux flowing through the iron core 51 in accordance with the first embodiment. In a claw pole type motor, the magnetic flux coming out of the magnet 42 (N-pole) of the rotor 4 flows through the claw-shaped magnetic pole (e.g., the upper claw-shaped magnetic pole 53) opposite to the magnet 42 in position. Then, the magnetic flux flows from the upper claw-shaped magnetic pole 53 to the neighboring claw-shaped magnetic pole (e.g., the lower claw-shaped magnetic pole 53) across the annular coil 52. Thereafter, the magnetic flux flows from the lower claw-shaped magnetic pole 53 to the magnet 42 (S-pole) opposite to the lower claw-shaped magnetic pole 53 and is then flowing back to the original magnet 42 (N-pole), thereby forming a complete magnetic path.

Figure 4A:
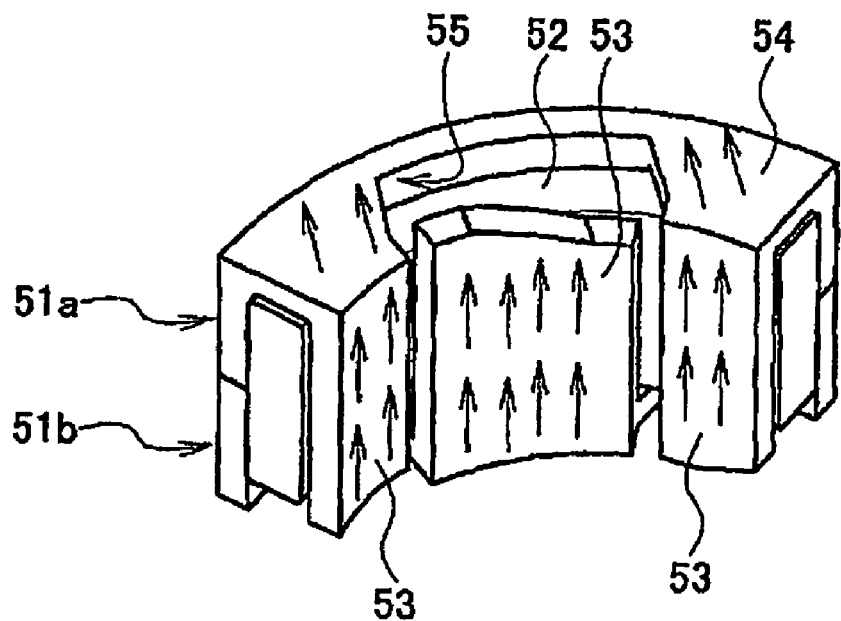
FIGS. 4A and 4B are perspective views schematically illustrating the magnetic flux flowing through an iron core 51 in the first embodiment.
Figure 4B:
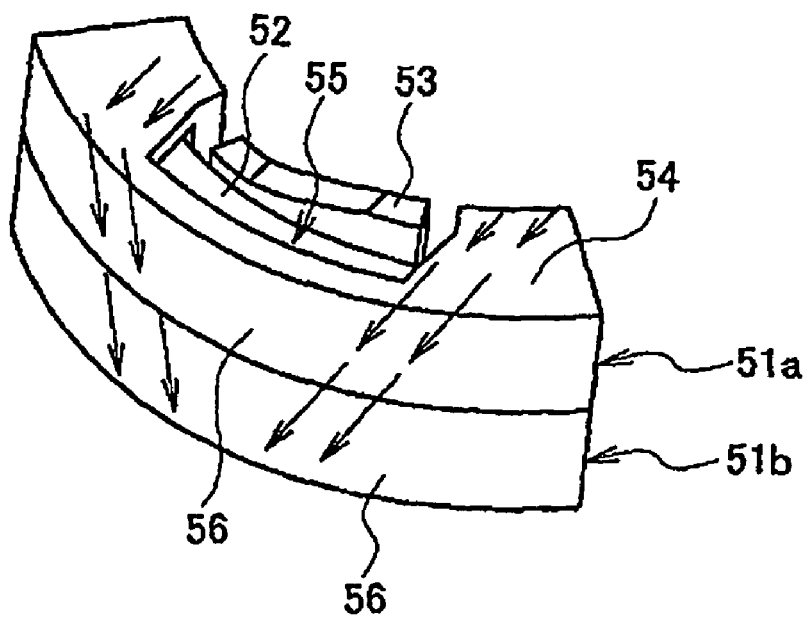
Figure 5A:
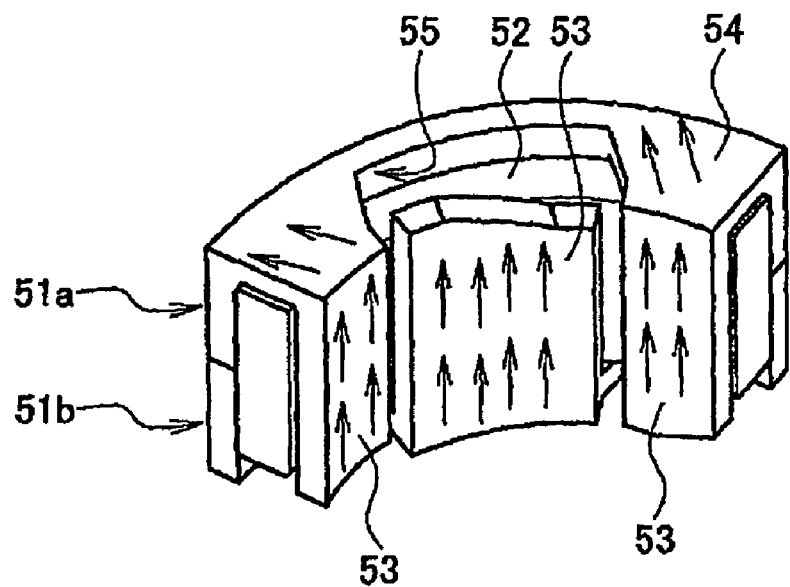
FIGS. 5A and 5B are perspective views schematically illustrating the magnetic flux flowing through the iron core 51 in the first embodiment.
Figure 5B:
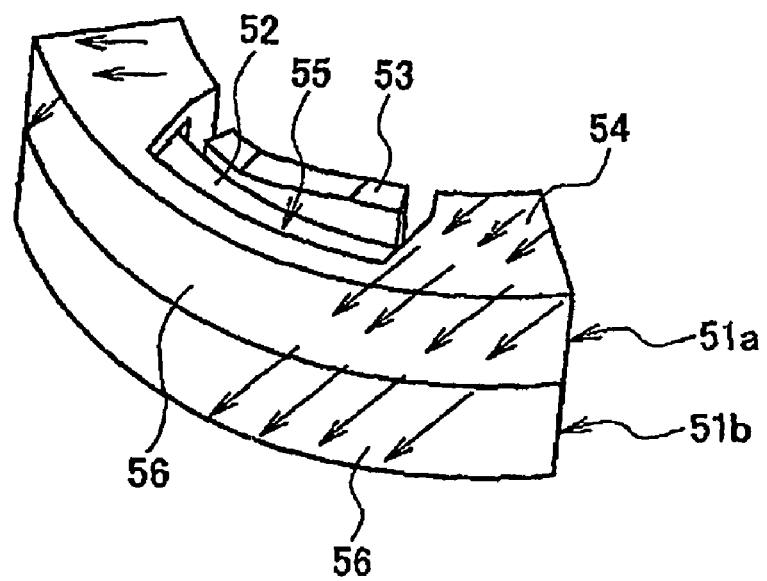

The magnetic path varies with the shape and operation state of a magnetic circuit and may take following two patterns. The first pattern refers to a case that, as shown in FIGS. 4A and 4B, the magnetic flux flowing through an arbitrary claw-shaped magnetic pole (e.g., the upper claw-shaped magnetic pole 53) is divided into two flux streams and then flows toward two neighboring claw-shaped magnetic poles (e.g., the lower claw-shaped magnetic poles 53). The second pattern refers to a case that, as shown in FIGS. 5A and 5B, the magnetic flux flowing through an arbitrary claw-shaped magnetic pole (e.g., the upper claw-shaped magnetic pole 53) is not divided into two flux streams but flows in a uniform direction toward one neighboring claw-shaped magnetic pole (e.g., the lower claw-shaped magnetic pole 53).

As can be seen in the two patterns, the yoke portion of the iron core 51 has regions through which magnetic flux hardly flows, i.e., non-magnetic path regions which do not include the magnetic path. The non-magnetic path regions are rarely used as the magnetic circuit.

In the present embodiment, the cutout portions 55 are formed only in the end surface portions 54 of the non-magnetic path regions. There is a case that each of the end surface portions 54 is cut away in order to secure a gap with respect to the claw-shaped magnetic poles 53 extending from the other of the end surface portions 54. The cutout portions 55 of the present embodiment are expanded toward the sidewall portion 56 within the extent of the non-magnetic path regions beyond the cutouts which are formed to secure the gap.

In accordance with the present embodiment, the cutout portions 55 is provided in the iron core 51 so that it is possible to reduce the quantity of the material used in forming the iron core 51, thereby saving material cost and the like effects. Since the cutout portions 55 are formed in the non-magnetic path regions of the iron core, there is no possibility that the cutout portions become an obstacle in the magnetic path. This makes it possible to suppress deterioration of the function of the iron core 51 as the magnetic circuit. Furthermore, the cutout portions 55 help to widen the cavity portions of the iron core 51. Therefore, in case of molding the stator 5 in the pump, it is possible to widen the flow path of a molding material in the iron core 51. This enhances moldability, which leads to an increase in the yield rate and a decrease in the production cost.

Second Embodiment

Figure 6A:
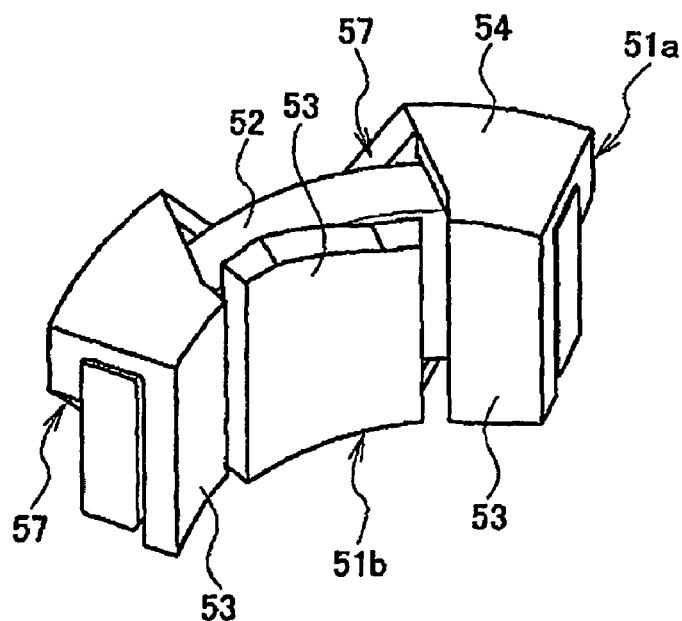
FIGS. 6A and 6B are schematic perspective views of a stator 5 in accordance with a second embodiment.
Figure 6B:
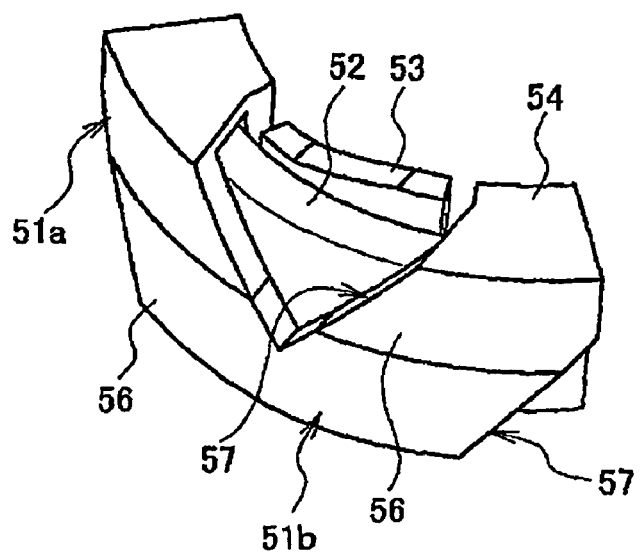

FIGS. 6A and 6B are schematic perspective views of the stator 5 in accordance with a second embodiment of the present invention, which correspond to FIGS. 3A and 3B showing the first embodiment. The pump of the second embodiment differs from that of the first embodiment in terms of the structure of the stator 5. The same parts as in the first embodiment will be designated by like reference numerals and will be omitted from duplicate description. Hereinafter, description will proceed with emphasis placed on the different points.

As in the first embodiment, the stator 5 includes an annular iron core 51 and an annular coil 52 received within the iron core 51. The iron core 51 includes a yoke portion and a plurality of claw-shaped magnetic poles 53. The yoke portion has a generally C-like cross sectional shape opened in the inner circumferential surface opposite to the rotor 4. The yoke portion has a cylindrical sidewall portion 56 for covering the outer circumferential surface of the annular coil 52 and a pair of end surface portions 54 between which the annular coil 52 is embedded in a vertical direction.

One of the features of the present embodiment resides in that cutout portions 57 are formed in the yoke portion including the upper and lower end surface portions 54 and the sidewall portion 56. The cutout portions 57 are formed by cutting away non-magnetic path regions of the yoke portion where magnetic paths formed by the magnetic flux flowing through the neighboring claw-shaped magnetic poles 53 are not included.

Figure 7A:
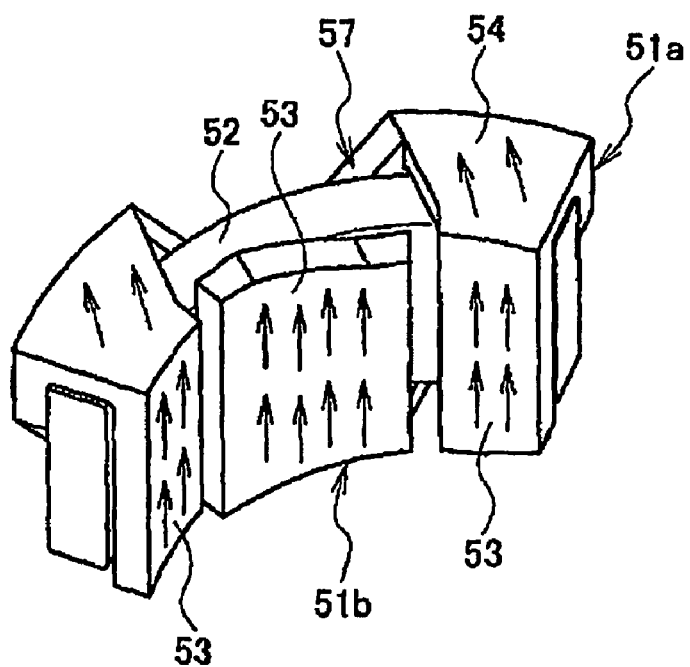
FIGS. 7A and 7B are perspective views schematically illustrating the magnetic flux flowing through an iron core 51 in the second embodiment.
Figure 7B:
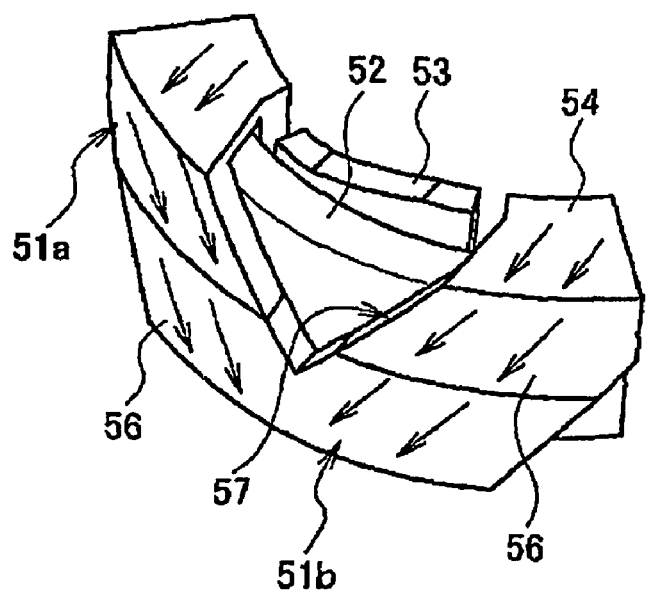
Figure 8A:
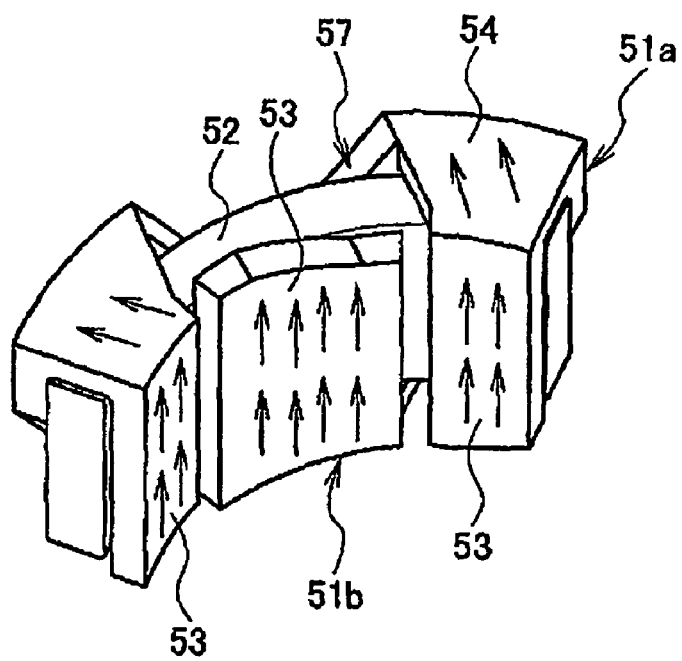
FIGS. 8A and 8B are perspective views schematically illustrating the magnetic flux flowing through the iron core 51 in the second embodiment.
Figure 8B:
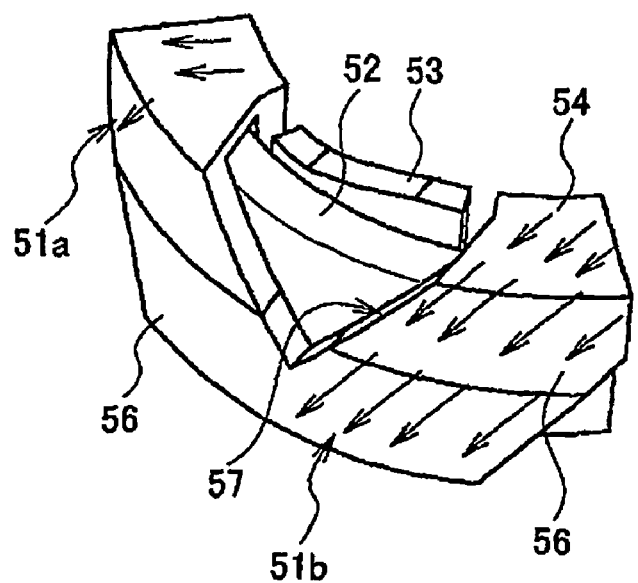

FIGS. 7A and 7B and FIGS. 8A and 8B are perspective views schematically illustrating the magnetic flux flowing through the iron core 51 in the second embodiment. The magnetic flux has either a flow pattern in which, as illustrated in FIGS. 7A and 7B, the magnetic flux flowing through an arbitrary claw-shaped magnetic pole (e.g., the upper claw-shaped magnetic pole 53) is divided into two flux streams and then flows toward two neighboring claw-shaped magnetic poles (e.g., the lower claw-shaped magnetic poles 53) or a flow pattern in which, as shown in FIGS. 8A and 8B, the magnetic flux is not divided into two flux streams but flows in a uniform direction toward one neighboring claw-shaped magnetic pole (e.g., the lower claw-shaped magnetic pole 53). Therefore, the yoke portion of the iron core 51 has regions through which magnetic flux hardly flows, i.e., non-magnetic path regions which do not include the magnetic path. The non-magnetic path regions are rarely used as the magnetic circuit.

In the present embodiment, the cutout portions 57 are formed in the end surface portions 54 and the sidewall portion 56 of the non-magnetic path regions.

In accordance with the present embodiment, it is possible to provide the same advantageous effects as is available in the first embodiment. Since the cutout portions 57 are formed in the sidewall portion 56 as well as the end surface portions 54, it becomes possible to further reduce the quantity of the material used in producing the iron core 51, thereby saving material cost and the like. The cutout portions 55 formed up to the sidewall portion 56 can also be used as an outlet opening through which lead lines extend from the annular coil 52 to the outside.

In case of forming the cutout portions 57 up to the sidewall portion 56, there is a possibility that the iron core 51 becomes complex in shape, which may lead to an increase in the number of molds used in a molding process, thereby increasing the production costs. From this standpoint, formation of the cutout portions 55 only in the end surface portions 54 is advantageous in reducing the production costs. However, the quantity of the material used in producing the iron core 51 becomes smaller in case of forming the cutout portions 57 up to the sidewall portion 56 than in case of forming the cutout portions 55 only in the end surface portions 54. This makes it possible to provide an effect of material cost saving.

Figure 9A:
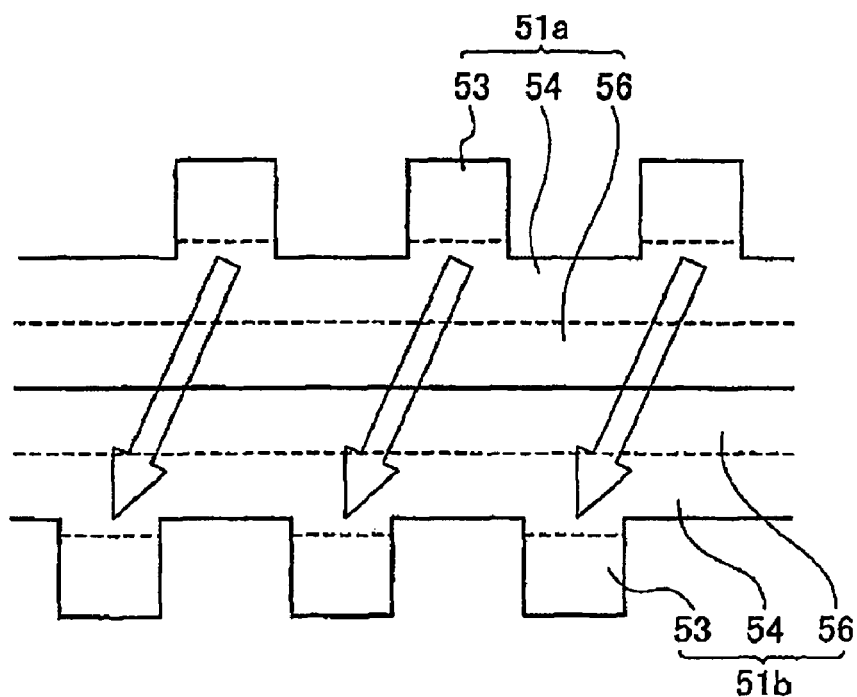
FIGS. 9A, 9B and 9C are development views illustrating the iron core 51 in a flattened shape.
Figure 9B:
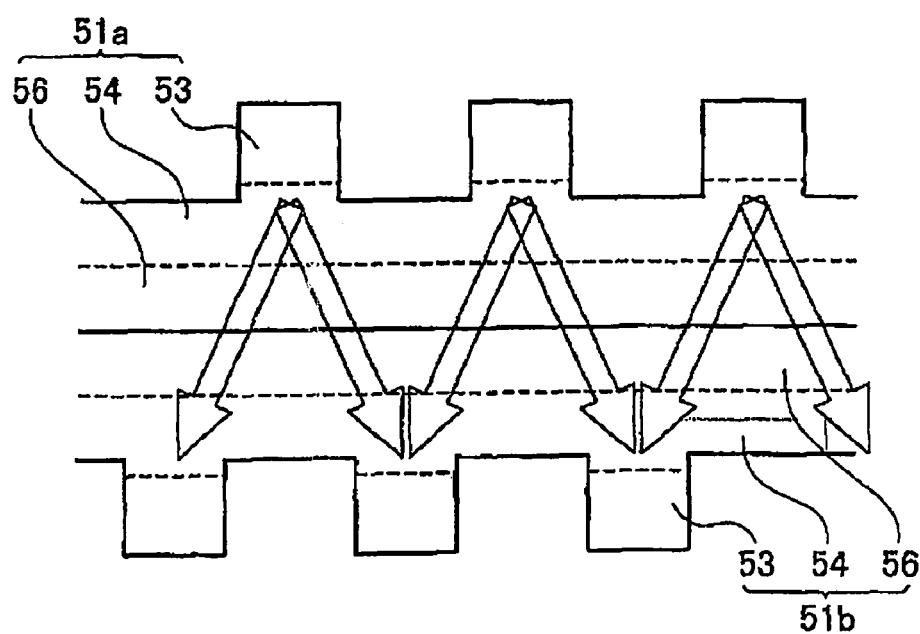
Figure 9C:
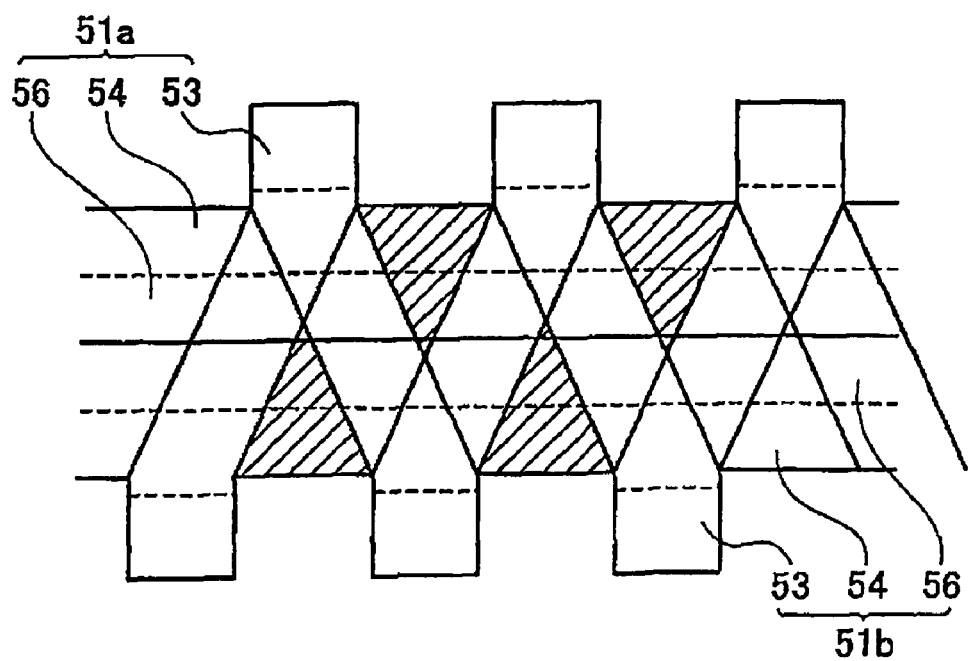

FIGS. 9A, 9B and 9C are development views illustrating the iron core 51 in a flattened shape, in which views the flow of the magnetic flux is indicated by arrows. As set forth above in connection of the respective embodiments, the magnetic flux has either a flow pattern in which the magnetic flux in an arbitrary claw-shaped magnetic pole 53 flows in a uniform direction toward one neighboring claw-shaped magnetic pole 53 (see FIG. 9A) or a flow pattern in which the magnetic flux is divided into two flux streams and then flows toward two neighboring claw-shaped magnetic poles 53 (see FIG. 9B).

In this connection, the magnetic flux flowing between the neighboring claw-shaped magnetic poles 53 tends to rectilinearly flow toward the corresponding positions. Therefore, it is possible to demarcate magnetic paths by straightly interconnecting position-corresponding boundary points of the neighboring claw-shaped magnetic poles 53 (that is, the joining regions of the claw-shaped magnetic poles 53 and the end surface portions 54) along the outer circumferential surface of the yoke portion (see FIG. 9C). The straight lines for demarcating the magnetic paths define the non-magnetic path regions (the hatched regions) and represent the boundaries along which the cutout portions 55 or 57 can be formed. In the present invention, it is possible to arbitrarily set the cutout portions 55 or 57 within the extent of the non-magnetic path regions.

While the iron core 51 is formed of a dust core in the foregoing embodiments, the present invention is not limited thereto. Alternatively, the iron core 51 may be produced by injection-molding a magnetic material, i.e., a mixture of insulation-coated iron powder and a binder. In this case, the magnetic material may be a mixture of iron powder, the surface of which has been subjected to an insulation treatment such as a phosphate coating treatment or the like, and thermoplastic resin such as nylon or the like. Formation of the iron core 51 with a dust core is more advantageous than the use of an electromagnetic soft iron material in that it is possible to reduce the loss of material and to provide a high output power motor with the same volume. The injection molding of the iron core 51 is more advantageous than the use of a dust core in that it is possible to reduce the production costs.

While the pump employing the claw pole type motor as its driving power source has been illustrated in the foregoing embodiments, the claw pole type motor itself can serve as one aspect of the present invention.

While the invention has been shown and described with respect to the embodiments, it will be understood by those skilled in the art that various changes and modifications may be made without departing from the scope of the invention as defined in the following claims.

What is claimed is:

1. A claw pole motor comprising:
   a rotatably supported rotor having a magnet arranged on an outer circumferential surface thereof; and
   a stator including an annular iron core arranged around the outer circumferential surface of the rotor in a facing relationship with the rotor and an annular coil received within the iron core,
   wherein the iron core includes a yoke portion having a generally C-like cross sectional shape and opened in an inner circumferential surface opposite to the rotor, a plurality of upper claw-shaped magnetic poles arranged along an inner circumferential surface of the annular coil and curved to extend axially downwardly from an upper inner edge of the yoke portion and a plurality of lower claw-shaped magnetic poles arranged along an inner circumferential surface of the annular coil and curved to extend axially upwardly from a lower inner edge of the yoke portion, the upper claw-shaped magnetic poles and the lower claw-shaped magnetic poles being alternately arranged along a circumferential direction of the iron core, the yoke portion having cutout portions formed outside of regions demarcated by straightly interconnecting position-corresponding boundary points of the neighboring claw-shaped magnetic poles along an outer circumferential surface of the yoke portion, and
   wherein the yoke portion includes a cylindrical sidewall portion covering an outer circumferential surface of the annular coil and a pair of end surface portions, the annular coil being interposed in a vertical direction between the pair of end surface portions, and the cutout portions being formed over the end surface portions and the sidewall portion.

2. The claw pole motor of claim 1, wherein the iron core is formed of a dust core made of compression-molding of insulation-coated iron powder and a binder.

3. The claw pole motor of claim 1, wherein the iron core is made of injection-molding a magnetic material formed of a mixture of insulation-coated iron powder and a binder.

4. A pump comprising the claw pole motor of claim 1 as a driving power source.

* * * * *